No. 732,853. PATENTED JULY 7, 1903.
J. H. HENDERSON & E. D. JEROME.
REIN SUPPORTER.
APPLICATION FILED APR. 20, 1903.
NO MODEL.
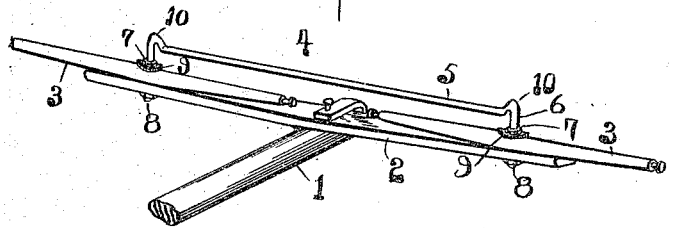
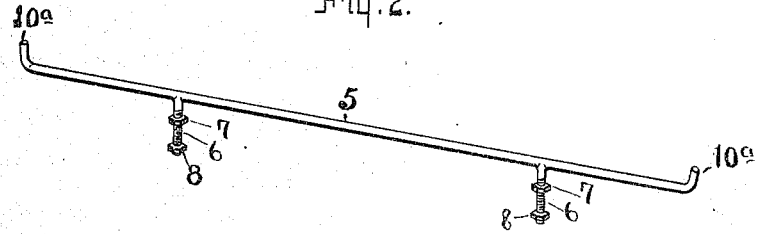
WITNESSES
Chas. G. Beale.
A. M. Stenstanger.
INVENTORS,
John H. Henderson and
Eugene D. Jerome
by Edward A. Lawrence,
their attorney.

No. 732,853. Patented July 7, 1903.

UNITED STATES PATENT OFFICE.

JOHN H. HENDERSON AND EUGENE D. JEROME, OF ALLEGHENY, PENNSYLVANIA.

REIN-SUPPORTER.

SPECIFICATION forming part of Letters Patent No. 732,853, dated July 7, 1903.

Application filed April 20, 1903. Serial No. 153,461. (No model.)

*To all whom it may concern:*

Be it known that we, JOHN H. HENDERSON and EUGENE D. JEROME, citizens of the United States, and residents of the city of Allegheny, county of Allegheny, and State of Pennsylvania, have invented certain new and useful Improvements in Supports for Reins, of which the following is a specification.

In the accompanying drawings, Figure 1 is a front elevation of our invention shown in place, while Fig. 2 is a front elevation of a modification thereof.

Our invention consists in a new and improved device for supporting driving-reins. In driving a two-horse team great annoyance is experienced by the reins becoming caught between the double and swingle trees of the traction-gear, frequently resulting in the loss of control of the horses.

Our invention consists generally in a support or rail mounted on the doubletree and adapted to keep the reins sufficiently elevated out of contact with the swingletrees.

In the drawings, 1 is a vehicle-tongue, to which is attached in the usual manner the doubletree 2.

3 3 are the swingletrees.

4 is a rod or rail, preferably made of metal, consisting of a horizontal portion 5 and two vertical portions 6 6. Said vertical portions 6 6 are provided a short distance above their lower extremities with shoulders 7 7, and their extremities are threaded to engage nuts 8 8. The said extremities of portions 6 6 pass through the bolt-holes in swingletrees 3 3 and doubletree 2, as shown in Fig. 1, the shoulders 7 7 preventing their passage therethrough beyond a certain degree. The nuts 8 8 are then screwed onto the threaded extremities of said portions 6 6 until the swingletrees are held properly in place and secured between the shoulders 7 7 and nuts 8 8.

9 9 are the usual clevises.

10 10 are elevated or curved portions at the extremities of horizontal portion 5 of the support.

It is evident that the driving-reins will be supported above the swingletrees by resting on horizontal portion 5 of support 4 and be prevented from sliding off at the sides by elevated portions 10 10.

We have shown the stops 10 10 made by upwardly-curved portions of part 5; but of course any form of stop may be substituted, such as a projection of any character.

In Fig. 2 we illustrate a modification of our invention wherein the horizontal portion 5 is extended beyond the vertical portions 6 6 and terminates in stops $10^a$ $10^a$ of any convenient design, though in the illustration we have shown the ends of portion 5 turned up to form the stops.

It will be evident from the above that our invention provides a convenient and compact device for effecting the ends desired—that of enabling the driver to maintain perfect control of the team by means of the reins. By increasing the height of portions 6 6 we may elevate the horizontal portion 5 sufficiently to prevent the horses' tails from being flung over the reins.

We claim as follows:

1. A rein-supporter consisting of a substantially horizontal portion; two substantially vertical portions, integral therewith, adapted to serve as the pivot-bolts for the swingletrees of a two-horse vehicle and threaded at their extremities for the reception of suitable nuts, and stops on said vertical portions adapted to bear against the upper surfaces of said swingletrees.

2. A rein-supporter consisting of a substantially horizontal portion; two upwardly-curved portions at the extremities of said horizontal portion and integral therewith; two substantially vertical portions, integral with said above construction, adapted to serve as the pivot-bolts for the swingletrees of a two-horse vehicle and threaded at their extremities for the reception of suitable nuts, and stops on said vertical portions adapted to bear against the upper surfaces of said swingletrees.

Signed by us this 18th day of April, 1903, at Pittsburg, Pennsylvania.

JNO. H. HENDERSON.
EUGENE D. JEROME.

Attest:
EMELINE RUTTER,
EDWARD A. LAWRENCE.